(12) United States Patent
Kotak et al.

(10) Patent No.: US 10,846,179 B2
(45) Date of Patent: Nov. 24, 2020

(54) HITLESS REPAIR FOR NETWORK DEVICE COMPONENTS

(71) Applicant: Arista Networks, Inc., Santa Clara, CA (US)

(72) Inventors: Ketan Kotak, Milpitas, CA (US); Eudean Michael Sun, Walnut Creek, CA (US); Sriram Chidambaram, Sunnyvale, CA (US)

(73) Assignee: Arista Networks, Inc., Santa Clara, CA (US)

( * ) Notice: Subject to any disclaimer, the term of this patent is extended or adjusted under 35 U.S.C. 154(b) by 170 days.

(21) Appl. No.: 16/180,741

(22) Filed: Nov. 5, 2018

(65) Prior Publication Data

US 2020/0142775 A1    May 7, 2020

(51) Int. Cl.
  *G06F 11/14* (2006.01)
  *H04L 12/24* (2006.01)
  *G06F 8/656* (2018.01)

(52) U.S. Cl.
  CPC ............ *G06F 11/142* (2013.01); *G06F 8/656* (2018.02); *H04L 41/082* (2013.01)

(58) Field of Classification Search
  CPC ............ G06F 11/0793; G06F 11/1004; G06F 11/1008; G06F 11/1402; G06F 11/1415; G06F 11/142; G06F 11/1433; G06F 8/65; G06F 8/654; G06F 8/656; G06F 8/66; H04L 41/0672; H04L 41/0816; H04L 41/082
  See application file for complete search history.

(56) References Cited

U.S. PATENT DOCUMENTS

| 6,052,531 A | 4/2000 | Waldin, Jr. et al. |
| 6,237,091 B1* | 5/2001 | Firooz .................. G06F 8/65 709/222 |
| 6,493,871 B1 | 12/2002 | McGuire et al. |
| 6,601,227 B1 | 7/2003 | Trimberger |
| 6,618,857 B1 | 9/2003 | Zimniewicz et al. |

(Continued)

FOREIGN PATENT DOCUMENTS

| WO | 2016/033785 A1 | 3/2016 |
| WO | 2018/160600 A2 | 9/2018 |

OTHER PUBLICATIONS

Luis Pina et al.; "Atomic Dynamic Upgrades Using Software Transactional Memory"; IEEE Press; Proceedings of the 4th International Workshop on Hot Topics in Software Upgrades (HotSWUp '12); pp. 21-25; Jun. 2012.

(Continued)

*Primary Examiner* — Gabriel Chu
(74) *Attorney, Agent, or Firm* — Chamberlain, Hrdlicka, White, Williams & Aughtry

(57) ABSTRACT

Methods, systems, and computer readable mediums for hitless repair. Hitless repair may include making a first determination, by a system control device (SCD) agent of a network device, that a SCD of the network device has experienced an error and/or is to be updated; making a second determination, by the SCD agent, that the SCD and the network device support the hitless repair; performing, by the SCD agent, a pre-hitless repair action set; and performing, by the SCD agent and after completing the pre-hitless repair action set, a post-hitless repair action set, including a hitless reset of the SCD.

24 Claims, 5 Drawing Sheets

(56) References Cited

U.S. PATENT DOCUMENTS

| | | | |
|---|---|---|---|
| 6,633,878 B1 | 10/2003 | Underwood | |
| 6,639,910 B1 | 10/2003 | Provencher et al. | |
| 6,718,535 B1 | 4/2004 | Underwood | |
| 6,754,175 B1 | 6/2004 | Akinpelu et al. | |
| 6,948,099 B1* | 9/2005 | Tallam | G06F 11/1417 |
| | | | 714/3 |
| 7,062,567 B2 | 6/2006 | Benitez et al. | |
| 7,127,713 B2 | 10/2006 | Davis et al. | |
| 7,213,152 B1 | 5/2007 | Gafken et al. | |
| 7,483,370 B1 | 1/2009 | Dayal et al. | |
| 7,506,338 B2 | 3/2009 | Alpern et al. | |
| 7,849,454 B2* | 12/2010 | Lambert | G06F 11/0709 |
| | | | 717/168 |
| 7,979,530 B1 | 7/2011 | Lee | |
| 8,171,466 B2 | 5/2012 | Langen et al. | |
| 8,219,794 B1* | 7/2012 | Wang | G06F 3/0607 |
| | | | 713/2 |
| 8,448,162 B2 | 5/2013 | Ramanathan et al. | |
| 8,849,949 B1 | 9/2014 | Pani | |
| 8,943,491 B2 | 1/2015 | Brogan et al. | |
| 8,959,215 B2 | 2/2015 | Koponen et al. | |
| 9,042,402 B1 | 5/2015 | Loganathan et al. | |
| 9,106,581 B1 | 8/2015 | Mackie et al. | |
| 9,292,332 B1* | 3/2016 | Liguori | G06F 9/45558 |
| 9,880,829 B2 | 1/2018 | Katiyar et al. | |
| 9,940,148 B1* | 4/2018 | Dannowski | G06F 9/45533 |
| 10,031,763 B1 | 7/2018 | Siebenthaler | |
| 10,079,781 B2 | 9/2018 | Cheng et al. | |
| 2004/0083476 A1* | 4/2004 | Zhou | G06F 8/656 |
| | | | 718/102 |
| 2005/0114852 A1 | 5/2005 | Chen et al. | |
| 2007/0220358 A1 | 9/2007 | Goodill et al. | |
| 2009/0277346 A1 | 11/2009 | Godecke et al. | |
| 2010/0199272 A1* | 8/2010 | Mahajan | G06F 11/2023 |
| | | | 717/171 |
| 2012/0173691 A1 | 7/2012 | Kothe et al. | |
| 2012/0311112 A1* | 12/2012 | Bender | G06F 8/654 |
| | | | 709/221 |
| 2013/0282884 A1 | 10/2013 | Chandrasekaran et al. | |
| 2014/0033187 A1* | 1/2014 | Beale | G06F 8/656 |
| | | | 717/168 |
| 2014/0086241 A1 | 3/2014 | Assarpour | |
| 2014/0269254 A1 | 9/2014 | Choorakkot Edakkunni et al. | |
| 2014/0337674 A1 | 11/2014 | Ivancic et al. | |
| 2015/0040115 A1 | 2/2015 | Capper | |
| 2015/0120905 A1 | 4/2015 | Leogrande et al. | |
| 2015/0149658 A1 | 5/2015 | Wei | |
| 2016/0013971 A1 | 1/2016 | Caviglia et al. | |
| 2016/0014023 A1 | 1/2016 | He et al. | |
| 2016/0094668 A1 | 3/2016 | Chang | |
| 2016/0210135 A1 | 7/2016 | Wroblewski et al. | |
| 2016/0234104 A1 | 8/2016 | Hoffmann | |
| 2016/0308718 A1* | 10/2016 | Lanka | G06F 13/00 |
| 2016/0315803 A1 | 10/2016 | Sadana et al. | |
| 2016/0342510 A1 | 11/2016 | Pani | |
| 2016/0352865 A1 | 12/2016 | Gupta et al. | |
| 2017/0123779 A1* | 5/2017 | Albot | G06F 12/109 |
| 2017/0168803 A1 | 6/2017 | Katiyar et al. | |
| 2018/0136940 A1 | 5/2018 | Mallichan et al. | |
| 2018/0139238 A1 | 5/2018 | Schultz et al. | |
| 2018/0239611 A1 | 8/2018 | Hu et al. | |

OTHER PUBLICATIONS

Sander van der Burg; "A Generic Approach for Deploying and Upgrading Mutable Software Components"; IEEE Press; Proceedings of the 4th International Workshop on Hot Topics in Software Upgrades (HotSWUp '12); pp. 26-30, Jun. 2012.

Daniel Cederman et al.; "Supporting Lock-Free Composition of Concurrent Data Objects: Moving Data between Containers"; IEEE Transactions on Computers; vol. 62, No. 9; pp. 1866-1878; Sep. 2013.

Katelin A. Bailey et al.; "Trusted Virtual Containers on Demand"; Proceedings of the 5th ACM Workshop on Scalable Trusted Computing (STC '10), ACM, Chicago, Illinois; pp. 63-72; Oct. 4, 2010.

Nikhil Handigol et al.; "Reproducible Network Experiments Using Container-Based Emulation"; Proceedings of the 8th International Conference on Emerging Networking Experiments and Technologies (CoNEXT '12), ACM, Nice, France; pp. 253-264; Dec. 10-13, 2012.

Tudor Dumitras; "Dependable, Online Upgrades in Enterprise Systems"; Proceedings of the 24th ACM SIGPLAN Conference Companion on Object Oriented Programming Systems Languages and Applications (OOPSLA '09), ACM, Orlando, Florida; pp. 835-836; Oct. 25-29, 2009.

Faris Keti et al.; "Emulation of Software Defined Networks Using Mininet in Different Simulation Environments"; IEEE 6th International Conference on Intelligent Systems, Modelling and Simulation; pp. 205-210; Feb. 2015.

Jim Bardgett et al. "nSwitching: Virtual Machine Aware Relay Hardware Switching to improve intra-NIC Virtual Machine Traffic"; IEEE ICC 2012—Next-Generation Networking Symposium; pp. 2700-2705; Jun. 10-15, 2012.

* cited by examiner

HITLESS REPAIR FOR NETWORK DEVICE COMPONENTS

BACKGROUND

Electronic devices that include certain types of data storage elements (e.g., static random access memory (SRAM)) may be susceptible to unexpected state changes. For example, a particle (e.g., ion, electron, photon, etc.) may cause a single event upset (SEU) when striking a portion of SRAM of a device, which may cause the value of a logical bit to change (e.g., from a 0 to a 1). Such unexpected state changes may alter the expected logical operation of a device, which may cause the device to malfunction in some way. Additionally, at certain times, components of devices may need to be updated in some way (e.g., have a new image installed).

SUMMARY

In general, in one aspect, embodiments of the invention relate to a method for hitless repair. The method may include making a first determination, by a system control device (SCD) agent of a network device, that a SCD of the network device is to be updated; making a second determination, by the SCD agent, that the SCD and the network device support the hitless repair; performing, by the SCD agent, a pre-hitless repair action set; and performing, by the SCD agent and after completing the pre-hitless repair action set, a hitless reset of the SCD.

In general, in one aspect, embodiments of the invention relate to a non-transitory computer readable medium including instructions that, when executed by a processor, perform a method for hitless repair. The method may include making a first determination, by a system control device (SCD) agent of a network device, that a SCD of the network device is to be updated; making a second determination, by the SCD agent, that the SCD and the network device support the hitless repair; performing, by the SCD agent, a pre-hitless repair action set; and performing, by the SCD agent and after completing the pre-hitless repair action set, a hitless reset of the SCD.

In general, in one aspect, embodiments of the invention relate to a system for hitless repair. The system may include a system control device (SCD) agent that includes circuitry and is configured to make a first determination that a SCD is to be updated; determine that the SCD and the network device support the hitless repair; perform a pre-hitless repair action set; and perform, after completing the pre-hitless repair action set, a hitless reset of the SCD by executing a set of hitless reset actions. The system may also include the SCD, including circuitry, operatively connected to the SCD agent, and configured to perform, in response to the execution of the set of hitless reset actions, the hitless reset.

Other aspects of the invention will be apparent from the following description and the appended claims.

DETAILED DESCRIPTION

Figure 1:
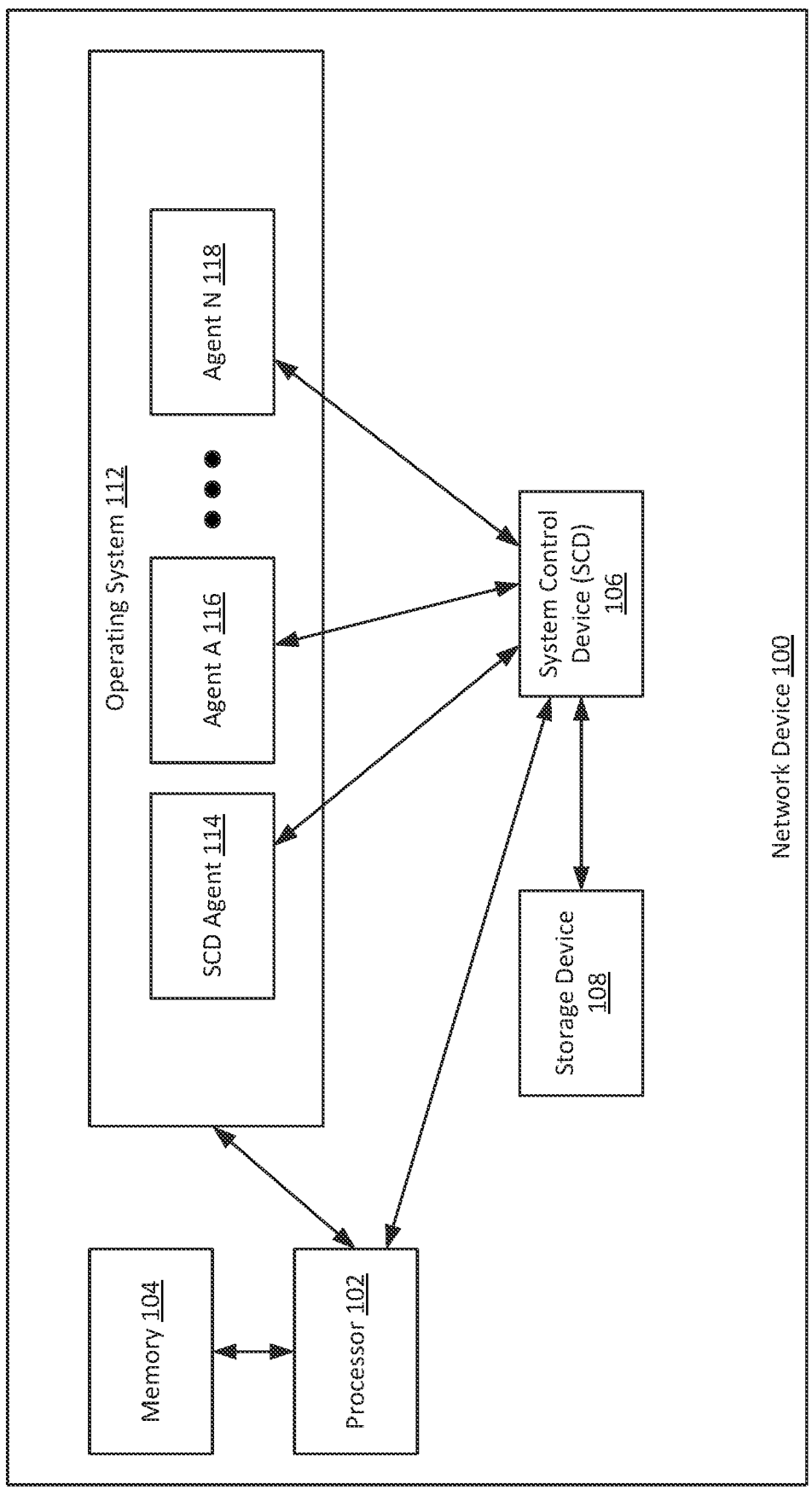
FIG. 1 shows a network device in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to hitless repair of components in network devices. Specifically, in one or more embodiments of the invention, network devices include system control devices (SCDs) that monitor and/or control other hardware components of the network device. In one or more embodiments of the invention, such SCDs are susceptible to single event upsets (SEUs), which may cause unexpected SCD behavior. In one or more embodiments of the invention, when an SEU occurs, a SCD sends an error detection signal (e.g., a cyclic redundancy check (CRC) error signal) to a SCD agent that is monitoring the SCD. Additionally or alternatively, a SCD may require an update of some sort (e.g., a new SCD image)

In one or more embodiments of the invention, upon receipt of the error detection signal, or that an update to an SCD is required, the SCD agent determines that the SCD supports hitless reset, and that any agents on the network device support hitless repair by being hitlessly restartable without impacting network device behavior. In one or more embodiments of the invention, if the SCD supports hitless reset and the agents support hitless repair, the SCD agent performs a pre-hitless repair action set, then executes hitless repair steps to perform a hitless reset.

In one or more embodiments of the invention, one or more agents operatively connected to a SCD may be interacting with network chips via the SCD. Abrupt shutdown of such agents may cause disruption of network traffic being processed by the network chip. For example, shutdown of the agents may cause the network chip to restart, causing temporary traffic loss. As another example, when the agents are not gracefully restarted, they may initiate actions to initialize the network chip, which may cause traffic loss for a time. One or more embodiments of the invention may mitigate the issue of network traffic loss by causing the agents associated with the SCD to either not shut down during a hitless reset, or by stopping the agents prior to the hitless reset, and gracefully restarting the agents once the hitless reset of the SCD is complete. In such embodiments, during the hitless reset of the SCD, the network chips continue processing network traffic normally with little or no interruption.

In one or more embodiments of the invention, the pre-hitless repair action set includes stopping agents on the network device, and then, after the hitless reset of the SCD is complete, restarting the agents of the network device.

In one or more embodiments of the invention, the pre-hitless repair action set includes determining which other agents executing on the network device are operatively connected to the SCD (e.g., monitoring the SCD, interacting with other components through the SCD, etc.), and then gracefully shutting only those agents down. In such embodiments, once the hitless reset of the SCD is complete, the agents that were shut down are gracefully brought back up. In one or more embodiments of the invention, the pre-hitless repair action set includes determining which other agents executing on the network device are operatively connected to the SCD and then causing those agents to not shut down abruptly (e.g., because of the agent trying to access unavailable hardware, thereby causing the agent to crash) for a delay-period when they become aware that the SCD has become unavailable, which happens during the reset. In such embodiments, if the SCD resets properly within the delay-period, the signal to shut the agents down is not asserted, and device operation continues. If on the other hand, the SCD does not reset properly, and remains unavailable to the agents for longer than the delay-period, the signal to shut down the agents asserts, and the agents shut down.

FIG. 1 shows a system in accordance with one or more embodiments of the invention. As shown in FIG. 1, the system includes a network device (100). In one or more embodiments of the invention, the network device (100) includes a processor (102), memory (104), a SCD (106), a storage device (108), and an operating system (112). The operating system (112) may include a SCD agent (114) and any number of other agents (e.g., agent A (116), agent N (118)). Each of these components is described below.

In one or more embodiments of the invention, a network device (100) is a physical device that includes and/or is operatively connected to persistent storage (not shown), memory (104) (e.g., random access memory (RAM)), one or more processor(s) (e.g., processor (102)) (e.g., integrated circuits), one or more physical network interfaces (which may also be referred to as ports) (not shown), any number of other hardware components (not shown) (e.g., light emitting diodes (LEDs), optical transceivers, etc.), and any number of SCDs (e.g., SCD (106)). In one or more embodiments of the invention, the one or more processors of a network device (e.g., a central processing unit (CPU)) are separate components from a network chip (not shown), one or more of which may also be components of a network device (100).

In one or more embodiments of the invention, a network chip is any hardware (e.g., circuitry), software, firmware, and/or combination thereof that includes functionality to receive, process, and/or transmit network traffic data units (e.g., IP packets, Media Access Control (MAC) frames, etc.) in accordance with one or more embodiments of the invention. In order to perform such functionality, a network chip may include any number of components. Such components may include, but are not limited to, one or more processors, one or more buffers (e.g., for implementing receive and/or transmit queues, such as virtual output queues (VOQs)), any type or amount of non-volatile storage, and/or any type or amount of volatile storage (e.g., RAM). A network chip may also include and/or be operatively connected to any number of physical network interfaces of a network device (100). Such interfaces may provide a path external to the network device (100) (e.g., to other devices), and/or may be operatively connected to other components internal to the network device (100) and each such interface may be an ingress and/or egress interface.

In one or more embodiments of the invention, a network chip may be monitored and/or controlled by an agent executing on the network device. In such embodiments, the agent may interact with the network chip via a SCD (106). In one or more embodiments of the invention, a network chip may continue to process network traffic even if a SCD fails and causes a loss of communication with the agent.

In one or more embodiments of the invention, a network device (100) includes functionality to, using one or more network chips, receive network traffic data units at any of the physical network interfaces (i.e., ports) of the network device and to process the network traffic data units to determine whether to: (i) drop the network traffic data unit; (ii) process the network traffic data unit; and/or (iii) transmit the network traffic data unit, based on the processing, from a physical network interface or port on the network device in accordance with one or more embodiments of the invention.

As a non-limiting example, a network chip may be hardware that receives network traffic data units at an ingress port, and determines out of which egress port on the network device (100) to forward the network traffic data units such as, for example, media access control (MAC) frames that include Internet Protocol (IP) packets.

In one or more embodiments of the invention, a network device (100) includes functionality to store (e.g., in persistent storage, in memory, etc.), any number of data structures (e.g., routing information base (RIB), forwarding information base (FIB), link state database, counters, etc.) for facilitating operation of at least some aspects of the network device. Such structures may be stored in a data repository (not shown) included in and/or operatively connected to the network device (100). In one or more embodiments of the invention, a data repository is any type of storage unit(s) and/or device(s) (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments of the invention, the network device data repository includes all or any portion of the persistent and/or non-persistent storage of the network device (100) as described above.

Examples of a network device (100) include, but are not limited to, a network switch, a router, a multilayer switch, a fibre channel device, an InfiniBand® device, etc. A network device is not limited to the aforementioned examples.

In one or more embodiments of the invention, a network device (100) also includes software and/or firmware stored in any data repository (not shown) and/or memory (not shown) (i.e., non-transitory computer readable mediums). Such software and/or firmware may include instructions which, when executed by the one or more processors (not shown) of the network device (100), cause the one or more processors to perform operations in accordance with one or more embodiments of the invention. The instructions may be in the form of computer readable program code to perform embodiments of the invention, and may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform functionality related to embodiments of the invention. The functionality of a network device (100) is not limited to the aforementioned examples.

In one or more embodiments of the invention, a network device (100) includes an operating system (112). In one or more embodiments of the invention, an operating system (112) includes any software and/or firmware for managing the resources (e.g., hardware, other software, etc.) of one or more network devices. More specifically, the operating system (112) may be a program or set of programs that manages all or a portion of the other software (e.g., applications, agents, etc.) executing on a network device. Management by an operating system (112) may include scheduling, hardware allocation, application execution, network access, management of access to stored files that are selectively made available to software executing within the operating system (112), etc. In one or more embodiments of the invention, the operating system executes, at least in part, on a processor (102), through which the operating system (112) may access and utilize memory (104) and persistent storage (not shown) of a network device (100)

In one or more embodiments of the invention, an operating system (112) or a network device (100) includes any number of agents (e.g., SCD agent (114), agent A (116), agent N, (118)), which interact with various hardware and software components of a network device (100). In one or more embodiments of the invention, interaction between an agent (114, 116, 118) and a hardware component of a network device (100) may be facilitated, at least in part, via a SCD (106). For example, an agent may monitor any number of network chips in order to initialize the network chip, monitor network traffic, change the behavior of the network chip, etc. In one or more embodiments of the invention, the agents (114, 116, 118) are operatively connected to the one or more hardware components that they monitor and/or control. As used herein, the phrase 'operatively connected' refers to any direct (e.g., physical wiring) or indirect (e.g., connected via any number of other devices or components) connection. As an example, the agents (114, 116, 118) may interact with the SCD (106) via the processor (102) of the network device (100). In one or more embodiments of the invention, such interactions include, but are not limited to, sending instructions, calling, initializing, reading from, writing to, etc.

In one or more embodiments of the invention, a SCD agent (114) includes functionality to monitor a SCD (106) and, if an error occurs (e.g., due to an SEU), to receive an error detection signal from the SCD, and take a set of actions in response to receiving the error detection signal. Such actions include, but are not limited to, causing shutdown of other agents (116, 118) operatively connected to the SCD (106), causing a hitless repair signal to be sent to the SCD (106) to cause a hitless reset of the SCD, and gracefully restarting the other agents (116, 118) once the hitless reset of the SCD (106) is complete. In one or more embodiments of the invention, the hitless repair signal is sent to the SCD via the processor and an instruction device (e.g., a complex programmable logic device (CPLD)) (not shown) that is connected to one or more pins of the SCD (106)). In one or more embodiments of the invention, a SCD agent (114) also includes functionality to determine if a monitored SCD requires an update and, if so, initiate a set of actions for hitless repair, including, but not limited to, hitless reset of the SCD (discussed further below in the descriptions of FIGS. 2-4) and restarting the hitlessly restartable agents.

In one or more embodiments of the invention, a network device (100) includes a SCD (106). In one or more embodiments of the invention, a SCD (106) includes hardware (e.g., circuitry) and programmed logic stored in data storage (not shown) of the SCD (106). For example, logic may be stored in one or more types of SRAM included in the SCD (106), such as block RAM and/or configuration RAM. Examples of a SCD (106) include, but are not limited to, a field programmable gate array (FPGA), a microcontroller, other devices types with memory capable of being programmed with device logic for performing various operations, and/or any combinations thereof. Though FIG. 1 shows an embodiment of the invention that includes one SCD (106), a network device (100) may include any number of SCDs without departing from the scope of the invention. In one or more embodiments of the invention, the SCD is operatively connected to a storage device (108) (described below) and, via a processor (102), any number of agents (114, 116, 118). The SCD (106) may also be operatively connected to one or more network chips (not shown)

In one or more embodiments of the invention, a SCD (106) is any device that includes a form of data storage (e.g., SRAM) (not shown) that is susceptible to unexpected state changes caused by single event upsets (SEUs). In one or more embodiments of the invention, a SEU is a state change caused by the collision of a particle with a sensitive portion (e.g., memory such as SRAM) of a SCD. SEUs may be caused by various particles, such as, for example, ions, electrons, photons, etc. Such particles may, for example, result from radiation, cosmic rays, etc. On occasion, such particles may collide with susceptible portions of a SCD (e.g., the SRAM) and cause an unexpected change in the state and/or operation of the SCD.

In one or more embodiments of the invention, a SCD (106) includes functionality to control the operation, or facilitate the monitoring and/or control (e.g., via an agent (114, 116, 118)), of one or more other components of a network device (100), which may be referred to as controlled devices (not shown). As an example of controlled devices, a network device (100) may include any number of light emitting diodes (LEDs) that provide information to an observer via the presence, color, or changing character of emitted light, which may be controlled by a SCD (106). As another example, a network device (100) may include any number of optical transceivers for network device interfaces that may be reset based on a state output by a SCD (106). Similarly, as discussed above, a network device (100) may include any number of network device chips (e.g., switch chips) for processing incoming and/or outgoing network traffic data units and the reset function of one or more such network device chips may be controlled by an agent (114, 116, 118) via a SCD (106). Types of controlled devices (118) are not limited to the preceding examples.

In one or more embodiments of the invention, a SCD (106) includes functionality to output one or more signals, and the one or more signals may represent a state output by the SCD (106) to a controlled device. In one or more embodiments of the invention, such signals serve to control, at least in part, some aspect of the operation and/or state of one or more controlled devices to which the SCD (106) is operatively connected.

In one or more embodiments of the invention, a SCD (106) also includes functionality to perform error detection and, if an error is detected, output an error detection signal (e.g., to a SCD agent (114) via a processor (102)). In one or more embodiments of the invention, an error detection signal is any signal that indicates that a SCD (106) has experienced an error (e.g., an SEU has changed the state of a bit from one to zero or vice versa).

One non-limiting example of such an error detection signal is a cyclic redundancy check (CRC) signal. In one or more embodiments of the invention, a CRC signal is a signal that is asserted (i.e., output from a SCD) when an error is detected in the logic of the SCD (106). For example, a CRC may loop through the contents of stored logic (e.g., logic stored in SRAM) of a SCD (106), performing a validation that the values included therein match expected values (e.g., by performing some mathematical operation on the data and comparing the result with an expected result of performing the operation on the data). In one or more embodiments of the invention, the CRC loop through the logic of a SCD (106) takes some amount of time, and, if an error is encountered, a CRC signal indicating the detected error (e.g., the error detection signal) is not asserted until the loop has completed.

In one or more embodiments of the invention, the SCD (106) experiencing an error causing it to assert an error detection signal may indicate that the SCD (106) is outputting an unexpected and/or unintended state, which may, for example, cause unintended actions or operation of one or more controlled devices operatively connected to the SCD (106). For example, if the SCD (106) is operatively connected to a network chip, then one or more unknown or unintended signals being output from the SCD (106) may adversely affect network traffic that is being processed by the network chip.

In one or more embodiments of the invention, the network device also includes a storage device (108), which may serve as a data repository for storing the logic used to program one or more SCDs (e.g., SCD (106)). In one or more embodiments of the invention, a storage device (108) may be operatively connected to and store logic for programming any number of SCDs. In one or more embodiments of the invention, the storage device (108) is any type of storage unit and/or device (e.g., a file system, database, collection of tables, or any other storage mechanism) for storing data. Further, the storage device (108) may include multiple different storage units and/or devices. The multiple different storage units and/or devices may or may not be of the same type or located at the same physical site. As an example, the storage device (108) may be a flash memory device.

While FIG. 1 shows a configuration of components, other configurations may be used without departing from the scope of the invention. For example, various components may be combined to create a single component. As another example, the functionality performed by a single component may be performed by two or more components. As another example, there may be additional components that facilitate the operative connections shown between any of the components. As another example, there may be more SCDs, more agents, more processors, etc. Accordingly, embodiments disclosed herein should not be limited to the configuration of components shown in FIG. 1.

Figure 2:
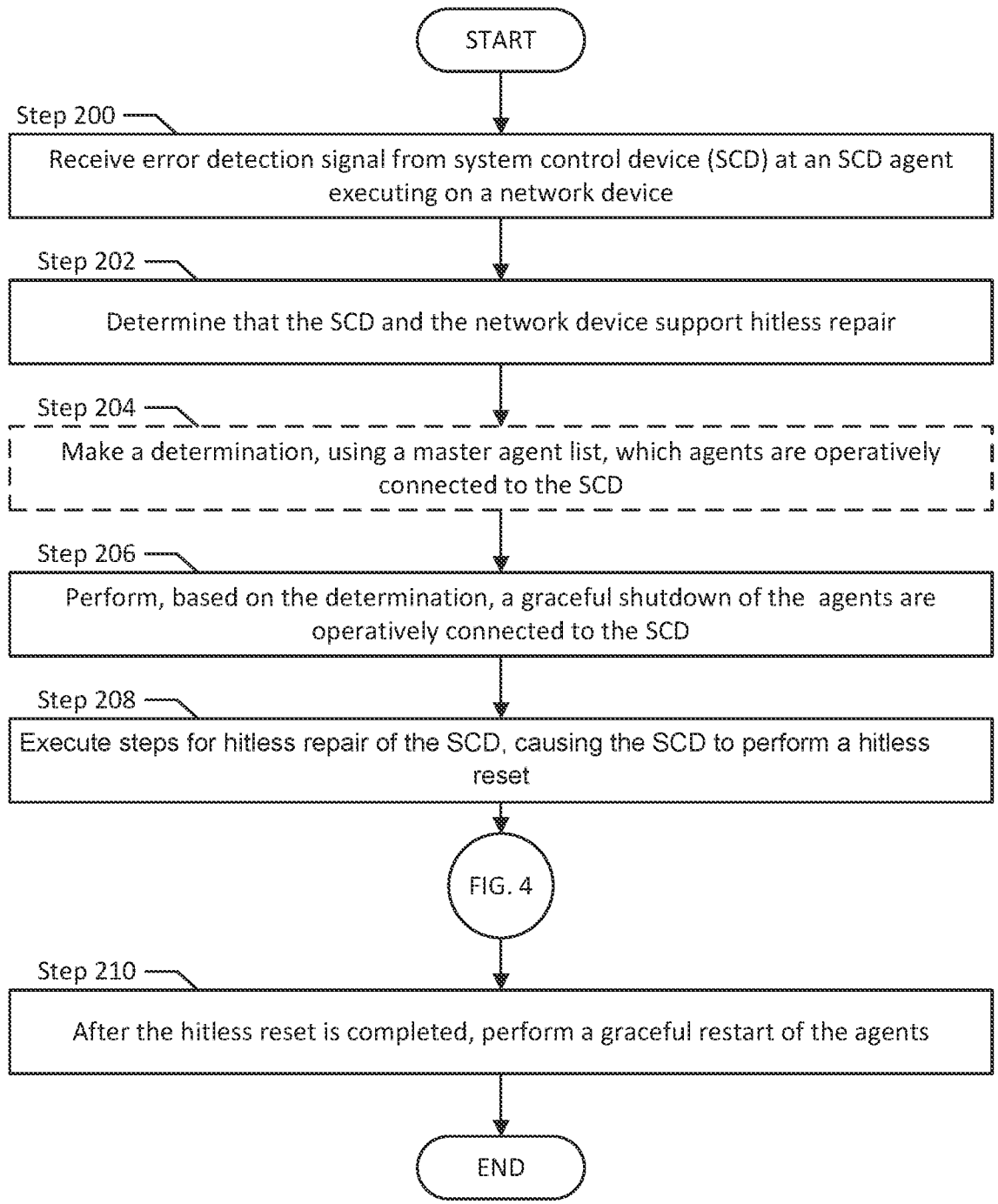
FIG. 2 shows a flowchart in accordance with one or more embodiments of the invention.

FIG. 2 shows a flowchart describing a method for hitless repair of a component (e.g., a SCD) of a network device in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

In Step 200, an error detection signal (e.g., a CRC signal) is received by a SCD agent from an operatively connected SCD (e.g., an FPGA). Additionally or alternatively, though not shown in FIG. 2, an error may be detected during polling of the state of the SCD by the SCD agent. In one or more embodiments of the invention, the error detection signal is received from the SCD via a processor of a network device. In one or more embodiments of the invention, the error detection signal is sent by the SCD upon detection of an error within the logic of the SCD. For example, the SCD may have been struck by an energetic particle, thereby causing an SEU that corrupted at least a portion of the logic of the SCD. In such an example, a CRC may catch the incorrect logic, and, accordingly, the SCD asserts a CRC signal that is transmitted to the SCD agent.

Although not shown in FIG. 2, in an additional or alternate embodiment, instead of receipt of an error detection signal, Step 200 may include determining that a SCD requires an update. For example, a new SCD image may be stored in a storage device operatively connected to the SCD, which should be programmed to the SCD.

In Step 202, the SCD agent determines that the SCD includes hitless reset functionality and that the network device supports hitless repair. In one or more embodiments of the invention, to support hitless reset, the SCD must include functionality to be reset independently of the rest of the network device, so that the network device need not be power cycled or reset. The existence of such functionality may be checked in any suitable manner. For example, the SCD agent may read information from the SCD that indicates whether the feature is supported. As another example, based on the model of the SCD, the network device may store whether or not the SCD supports hitless reset as information in a location accessible by the SCD agent.

In one or more embodiments of the invention, to support hitless repair, the network device must include agents that can be gracefully shut down and later restarted without impacting the hardware components to which they are operatively connected. For example, the network device may support an accelerated software upgrade feature that allows for software to be upgraded without the network device being power cycled or reset, and to facilitate such a process, agents of the network device are designed to be shut down and restarted with little or no impact on the ability of the network device to process network traffic data units. In such an example, the availability of the accelerated software upgrade on the network device may be determined by the SCD agent by accessing information related to the presence or not of the feature in the storage of the network device.

In one or more embodiments of the invention, though not shown in FIG. 2, the SCD agent may also request that a user (e.g., a network administrator) confirm whether the user desires to proceed with the hitless repair of the SCD. Such a request may be transmitted via a command line interface (CLI), a graphical user interface (GUI), via an application programming interface, during a startup configuration, and/or any other medium through which information of any kind may be transmitted and/or received. In other embodiments of the invention, though not shown in FIG. 2, the SCD agent also checks whether a "hitless repair" option has been set, which would indicate that, in the event of receipt of an error detection signal from a SCD, a hitless repair process is to be performed.

In one or more embodiments of the invention, though not shown in FIG. 2, if the SCD agent determines that the SCD does not include hitless reset functionality, the network device does not support hitless repair of a SCD, and/or hitless repair is not configured or desired by a user, then the process ends and alternate actions are taken, which may be configurable. Examples of such alternate actions include, but are not limited to, power cycling the network device to cause a reset of the SCD, merely logging the error so that a network administrator can take appropriate action in the future, etc.

In optional Step 204, a determination is made of what agents are operatively connected to the SCD from which an error detection signal was received in Step 200. In one or more embodiments of the invention, the network device includes such information in storage accessible by the SCD agent. For example, there may be a master list of agents and the one or more SCDs with which each agent is associated, which the SCD agent consults to determine which agents are connected to the SCD that asserted an error. Step 204 is shown as an optional Step because in one or more embodiments of the invention, all agents are shut down as part of the hitless repair process, eliminating the need to determine which are operatively connected to the SCD asserting an error detection signal.

In Step 206, a graceful shutdown of at least the agents operatively connected to the SCD is performed. As discussed above, in some embodiments, all of the agents, including the ones operatively connected to the SCD are gracefully shut down. For example, the agents may be gracefully shut down using all or part of an accelerated software upgrade process that is a feature of a given network device. In other embodiments, after determining which agents are operatively connected to the SCD asserting an error detection signal, only those agents are gracefully shut down. In one or more embodiments of the invention, gracefully shutting down an agent includes stopping the operation of the agent without impacting the hardware and/or software components with which the agent interacts.

In Step 208, steps for a hitless repair of the SCD are taken, causing the SCD to perform a hitless reset. In one or more embodiments of the invention, steps are executed by the SCD agent on the processor and, in turn, the processor transmits a signal to the SCD to cause the hitless reset. In one or more embodiments of the invention, the signal from the processor is sent to a separate device (e.g., a CPLD) that is configured to receive the signal, and send an appropriate reset signal to the correct one or more pins of the SCD. In one or more embodiments of the invention, the reset process includes obtaining the logic to be programmed to the SCD from a storage device, and then programming the SCD with the logic, thereby putting the SCD back in an intended state. For example, whatever error was caused in the logic of an FPGA by an SEU that was detected during a CRC check is fixed by a reprogramming of the logic of the FPGA. In one or more embodiments of the invention, as shown in FIG. 2, performing a hitless reset of the SCD includes a series of steps shown in FIG. 4 (described below), which may be performed before the method continues to Step 210.

In Step 210, once the hitless reset of the SCD from Step 208 is complete, the agents that were shut down in Step 206 are gracefully restarted. In one or more embodiments of the invention, gracefully restarting an agent includes starting the operation of the agent without impacting the hardware and/or software components with which the agent interacts. For example, for an agent that monitors and/or controls a network chip, rather than initializing the network chip as part of starting the agent, the agent instead reads the state of the network chip without impacting network traffic processing, and thereby resumes monitoring and/or controlling without impacting the functions of the network chip or ongoing network traffic.

Figure 3:
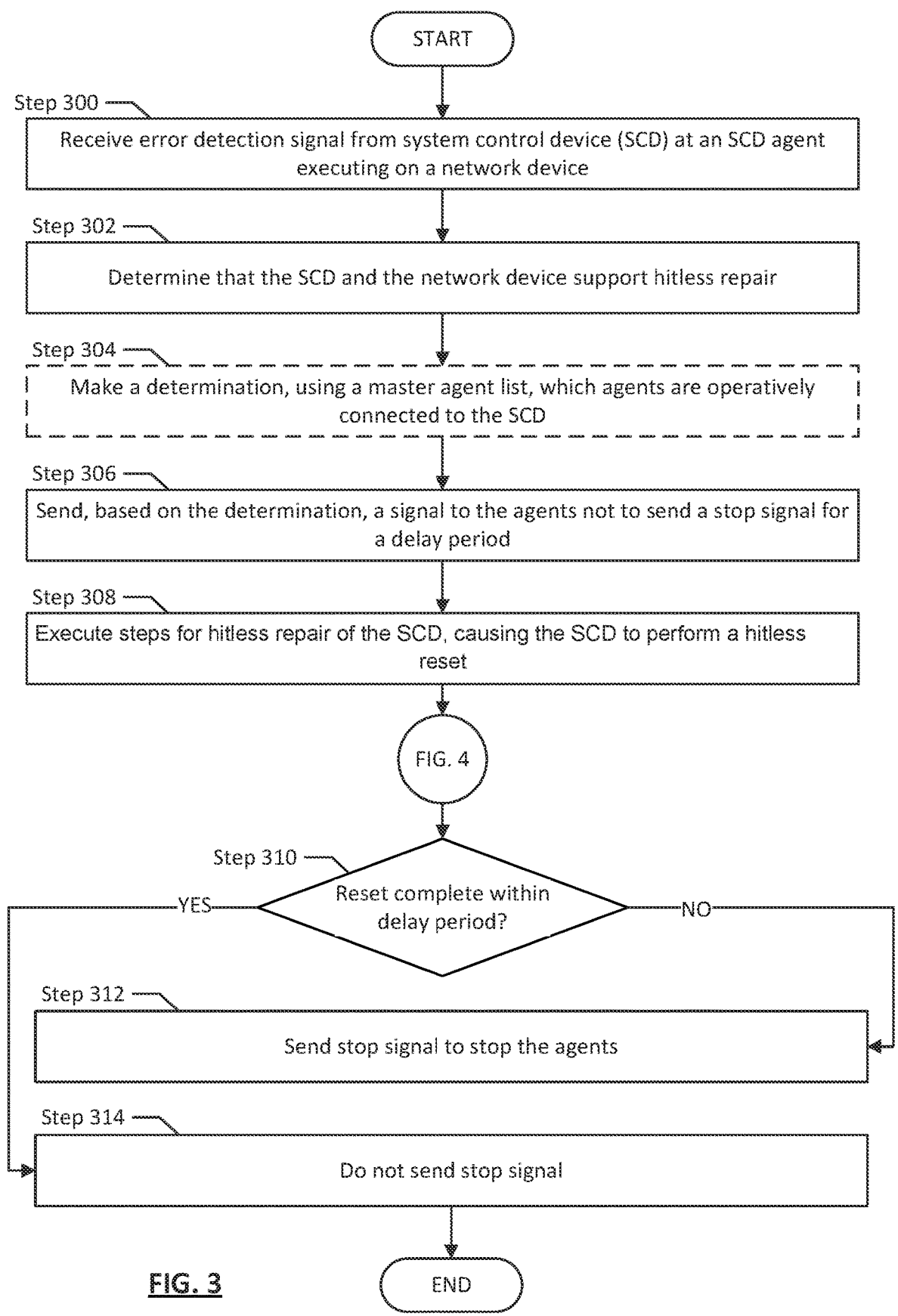
FIG. 3 shows a flowchart in accordance with one or more embodiments of the invention.

FIG. 3 shows a flowchart describing a method for hitless repair of a component (e.g., a SCD) of a network device in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

In Step 300, an error detection signal (e.g., a CRC signal) is received by a SCD agent from an operatively connected SCD (e.g., an FPGA). Additionally or alternatively, though not shown in FIG. 3, an error may be detected during polling of the state of the SCD by the SCD agent. In one or more embodiments of the invention, the error detection signal is received from the SCD via a processor of a network device. In one or more embodiments of the invention, the error detection signal is sent by the SCD upon detection of an error within the logic of the SCD. For example, the SCD may have been struck by an energetic particle, thereby causing an SEU that corrupted at least a portion of the logic of the SCD. In such an example, a CRC may catch the incorrect logic, and, accordingly, the SCD asserts a CRC signal that is transmitted to the SCD agent.

Although not shown in FIG. 3, in an additional or alternate embodiment, instead of receipt of an error detection signal, Step 300 may include determining that a SCD requires an update. For example, a new SCD image may be stored in a storage device operatively connected to the SCD, which should be programmed to the SCD.

In Step 302, the SCD agent determines that the SCD includes hitless reset functionality and that the network device supports hitless repair. In one or more embodiments of the invention, to support hitless reset, the SCD must include functionality to be reset independently of the rest of the network device, so that the network device need not be power cycled or reset. The existence of such functionality may be checked in any suitable manner. For example, the SCD agent may read information from the SCD that indicates whether the feature is supported. As another example, based on the model of the SCD, the network device may store whether or not the SCD supports hitless reset as information in a location accessible by the SCD agent.

In one or more embodiments of the invention, to support hitless repair, the network device must include agents that can delay for a delay-period a stop signal that is usually asserted to stop the agent when an operatively connected SCD becomes unavailable.

In one or more embodiments of the invention, though not shown in FIG. 3, the SCD agent may also request that a user (e.g., a network administrator) confirm whether the user desires to proceed with the hitless repair of the SCD. Such a request may be transmitted via a command line interface (CLI), a graphical user interface (GUI), via an application programming interface, during a startup configuration, and/or any other medium through which information of any kind may be transmitted and/or received. In other embodiments of the invention, though not shown in FIG. 3, the SCD agent also checks whether a "hitless repair" option available via a configuration command from a CLI has been set, which would indicate that, in the event of receipt of an error detection signal from a SCD, a hitless repair process is to be performed.

In one or more embodiments of the invention, though not shown in FIG. 3, if a SCD agent determines that the SCD does not include hitless reset functionality, the network device does not support hitless repair of a SCD, and/or hitless repair is not configured or desired by a user, then the process ends and alternate actions are taken to correct the error seen by the SCD. Examples of such alternate actions include, but are not limited to, power cycling the network device to cause a reset of the SCD, merely logging the error so that a network administrator can take appropriate action in the future, etc.

In Step 304, a determination is made of what agents are operatively connected to the SCD from which an error detection signal was received in Step 300. In one or more embodiments of the invention, the network device includes such information in storage accessible by the SCD agent. For example, there may be a master list of agents and the one or more SCDs with which each agent is associated, which the SCD agent consults to determine which agents are connected to the SCD that asserted an error.

In Step 306, a signal is sent to the other agents operatively connected to the SCD to not assert a stop signal when the SCD is hitlessly reset. In one or more embodiments of the invention, each of the agents includes a library that, among other things, monitors the presence of the SCD in the system. For example, the library may allow the agent to monitor the presence of the SCD via whether or not it is connected to a common bus (e.g., a peripheral component interface (PCI) bus). In one or more embodiments of the invention, when the agent becomes aware that an operatively connected SCD has become unavailable, a stop signal (e.g., a SIGBUS signal) is asserted, which abruptly shuts down the agent. In one or more embodiments of the invention, such a signal is prevented when an error detection signal has been received (i.e., Step 300) from a SCD that supports hitless reset on a network device that supports hitless repair of a SCD (i.e., Step 304). In one or more embodiments of the invention, the stop signal is prevented for a delay-period. In one or more embodiments of the invention, the delay-period is configurable by a user (e.g., via a CLI). In one or more embodiments of the invention, the delay-period is a set delay-period that cannot be changed.

In Step 308, steps for a hitless repair of the SCD are executed, causing the SCD to perform a hitless reset. In one or more embodiments of the invention, the hitless repair signal is sent from the SCD agent to the processor and, in turn, the processor transmits a signal to the SCD to cause the hitless reset. In one or more embodiments of the invention, the signal from the processor is sent to a separate device (e.g., a CPLD) that is configured to receive the signal, and send an appropriate reset signal to the correct one or more pins of the SCD. In one or more embodiments of the invention, the reset process includes obtaining the logic to be programmed to the SCD from a storage device, and then programming the SCD with the logic, thereby putting the SCD back in an intended state. For example, whatever error was caused in the logic of an FPGA by an SEU that was detected during a CRC check is fixed by a reprogramming of the logic of the FPGA. In one or more embodiments of the invention, the SCD becomes unavailable to operatively connected agents during the hitless reset. In one or more embodiments of the invention, as shown in FIG. 3, performing a hitless reset of the SCD includes a series of steps shown in FIG. 4 (described below), which may be performed before the method continues to Step 310.

In Step 310, a determination is made whether the SCD has become available again during the delay-period. For example, the agent may determine that the SCD has reappeared as a device attached to a common PCI bus. In one or more embodiments of the invention, if the SCD has not become available by the end of the delay-period, the method proceeds to Step 312. If, on the other hand, the SCD has become available again within the delay-period (e.g., the hitless reset successfully completed), the method proceeds to Step 314.

In Step 312, the stop signal that was delayed in Step 306 is allowed to assert, thereby causing the agents to abruptly stop, which may have an adverse effect on one or more devices operatively connected to the agent, either upon shutdown, or when the agent is later restarted.

In Step 314, based on the availability of the SCD within the delay-period occurring, the agents do not assert the stop signal, and instead merely resume normal operation, such as existed prior to the hitless reset.

Figure 4:
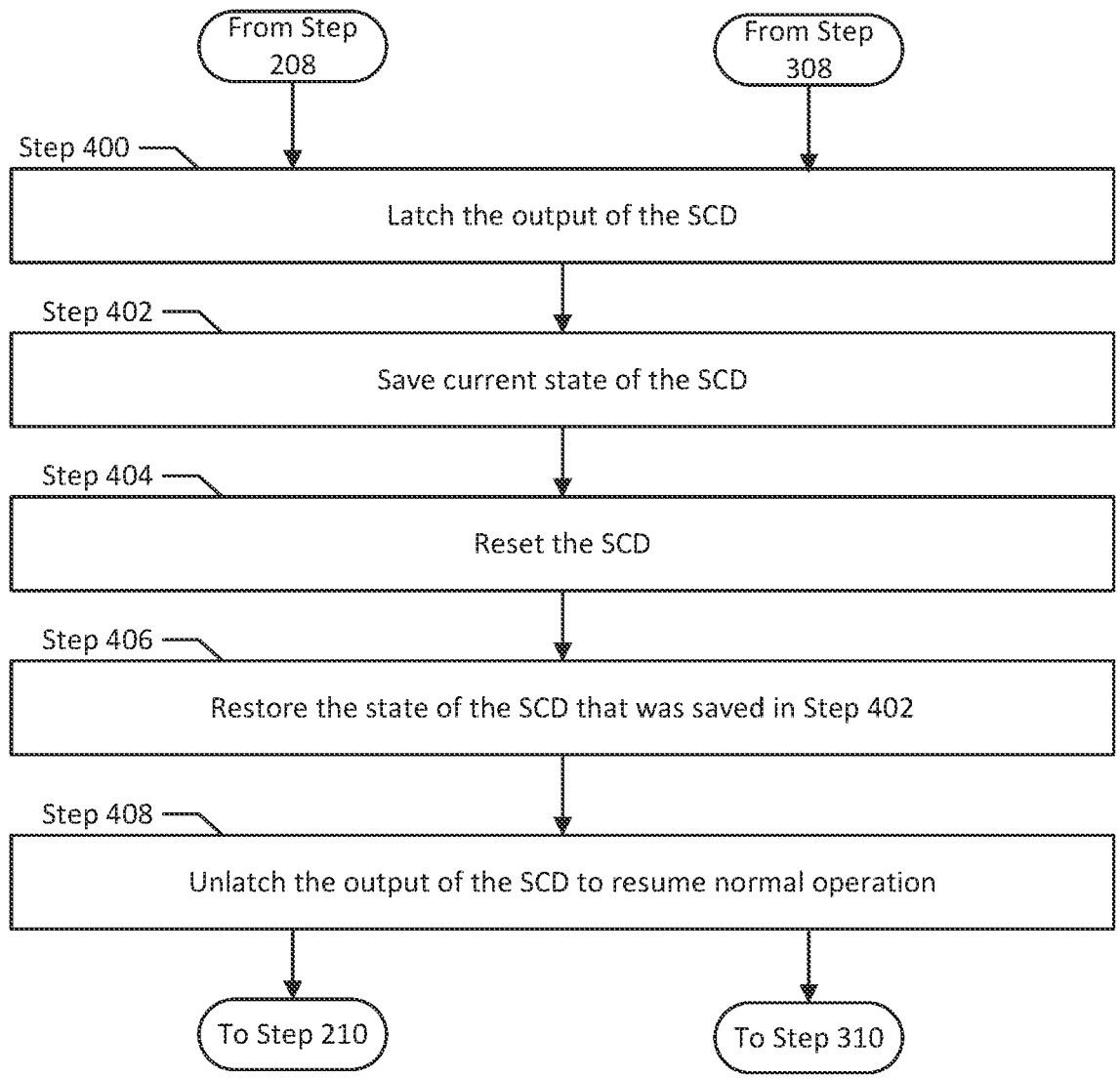
FIG. 4 shows a flowchart in accordance with one or more embodiments of the invention.

FIG. 4 shows a flowchart describing a method for a hitless reset of a component (e.g., a SCD) of a network device during a hitless repair process in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

As shown in FIG. 4, the Steps of FIG. 4 may be performed as part of Step 208 of FIG. 2, in which case upon completing the Steps shown in FIG. 4, the method returns to Step 210 of FIG. 2. Also, as shown in FIG. 4, the Steps of FIG. 4 may be performed as part of Step 308 of FIG. 2, in which case upon completing the Steps shown in FIG. 4, the method returns to Step 310 of FIG. 3.

In Step 400, the output of a SCD is latched. As used herein, the concept of latching an output of a component refers to any suitable method of capturing the output of a component for a period of time. For example, the output pins of an FPGA may be connected to a set of circuitry that saves the output without allowing the output to propagate to other components in a network device, unless some future event occurs (e.g., a hitless reset is completed, and the FPGA has been successfully re-imaged).

In Step 402, a current state of a SCD is saved. Saving the state of a SCD may include any suitable method of saving any information, or portion thereof, that is stored or otherwise present in the SCD or any portion thereof. For example, the SCD may include one or more storage devices that are storing information relevant to the operation of the SCD but that is not present in a SCD image and/or information relevant to the operation of one or more controlled devices, and such information may be stored in some other storage in a network device accessible by a SCD agent.

In Step 404, a SCD is reset. In one or more embodiments of the invention, the reset may involve any suitable method for resetting a component. For example, an assert signal may be applied to a reset pin of the SCD. As another example, power may be temporarily removed from the SCD, and then restored. Other methods of resetting a SCD may be used without departing from the scope of this invention.

In Step 406, the state of a SCD that was saved in Step 402 is restored to the SCD. In one or more embodiments of the invention, the state is restored using any method of transferring the saved state information back to the relevant location or portion of the SCD.

In Step 408, the output of the SCD is unlatched to resume normal operation of the SCD. In one or more embodiments of the invention, unlatching the state includes any method of allowing the latched state to propagate to any one or more components operatively connected to the SCD. Although not shown in FIG. 4, Step 408 may not occur until a determination is made that the previous steps in FIG. 4 were successfully completed.

Figure 5:
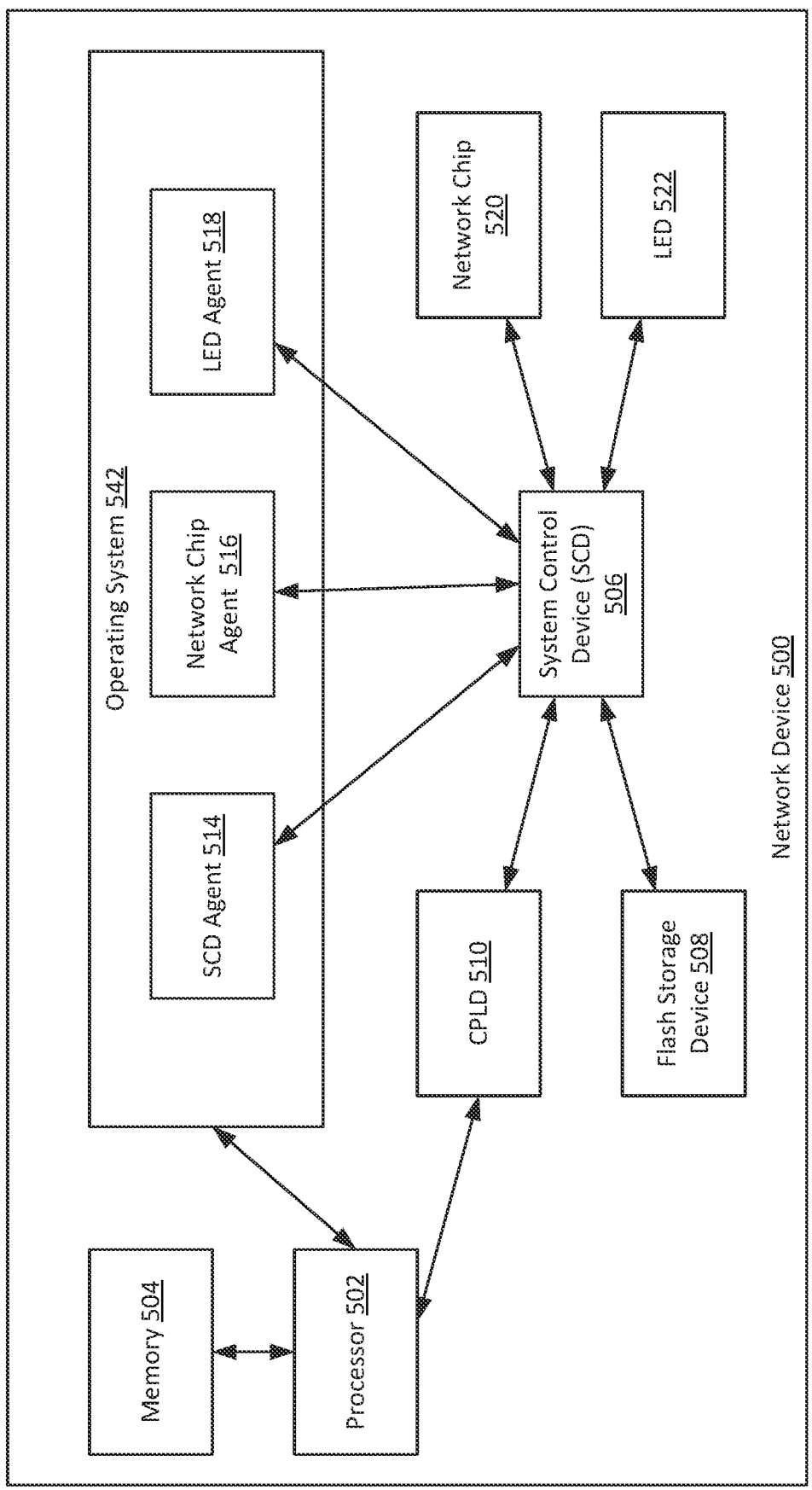
FIG. 5 shows an example in accordance with one or more embodiments of the invention.

FIG. 5 shows an example in accordance with one or more embodiments of the invention. The following example is for explanatory purposes only and not intended to limit the scope of the invention.

Referring to FIG. 5, consider a scenario in which a network device (500) includes a processor (502) operatively connected to memory (504), an operating system (542), and a CPLD (510). The operating system (542), which executes using the processor (502), includes a SCD agent (514), a network chip agent (516) and an LED agent (518). The network device (500) also includes a SCD (506) that is operatively connected to the CPLD (510), a flash storage device (508), a network chip (520), an LED (522) and the agents (514, 516, 518). The SCD agent monitors and controls, at least in part the SCD (506). The network chip agent (516) monitors and controls, at least in part the network chip (520). The LED agent monitors and controls, at least in part the LED.

In this scenario, a cosmic particle, originating from the sun, strikes the earth's atmosphere, creating ionized particles. At least one of the ionized particles, in turn, strikes the SCD (506) of the network device (500), causing the SCD (506) to be in an unexpected state, thereby affecting its interactions with the network chip (520) and the LED (522).

The SCD (506) in this scenario is an FPGA that implements a CRC to catch logic errors. Accordingly, during the next CRC calculation, the error in the logic caused by the SEU is detected, and the CRC error signal is asserted to the processor (502). The processor (502) passes the signal to the SCD agent (514).

Upon receipt of the CRC error signal, the SCD agent (514) consults a master agent list stored in storage of the network device (500) to determine that the network chip agent (516) and the LED agent (518) are operatively connected to the SCD (506).

Based on the determination of which agents are operatively connected to the SCD (506), the SCD agents initiates a graceful shutdown of the agents, thereby not impacting the operation of the network chip (520) (e.g., network traffic data unit processing) or the LED (e.g., on or off), which continue as normal.

Once the agents are shut down, the SCD agent (514) sends a hitless repair signal to the processor (502). The processor (502), in turn, sends a signal to the CPLD (510) to cause the CPLD (510) to send a reset signal to an appropriate pin of the SCD (506). Upon receipt of the reset signal, the SCD resets, which includes obtaining the logic for the SCD from the flash storage device (508) and using it to reprogram the logic of the SCD. The reprogramming of the logic of the SCD (506) eliminates the error caused by the SEU. Once the reset of the SCD is complete, the network chip agent (516) and the LED agent (518) are restarted.

Upon being restarted, rather than attempting to initialize the network chip (520) and the LED (522), the agents read the state of the components. Specifically, the LED agent (518) reads whether the LED is currently on or off, and the network chip agent (516) reads from the network chip (520) any relevant information needed to properly restart. Additionally or alternatively, state could be read from storage operatively connected to the processor, wherein was previously saved.

Embodiments of the invention described above allow for network devices to restart a SCD without having to power cycle or reset an entire network device. Additionally, the reset of the SCD is done in a manner that either gracefully stops and restarts operatively connected agents, or prevents abrupt shutdown of such agents for a delay-period to allow the SCD to reset before shutdown. Such behavior may prevent adverse effects of agent shutdown on network device components, such as network chips, which may mitigate negative impacts on the network device's ability to properly process network traffic.

While the invention has been described with respect to a limited number of embodiments, those skilled in the art, having benefit of this Detailed Description, will appreciate that other embodiments can be devised which do not depart from the scope of the invention as disclosed herein. Accordingly, the scope of the invention should be limited only by the attached claims.

What is claimed is:

1. A method for hitless repair, the method comprising:
   making a first determination, by a system control device (SCD) agent of a network device, that a SCD of the network device is to be updated;
   making a second determination, by the SCD agent, that the SCD and the network device support the hitless repair;
   performing, by the SCD agent, a pre-hitless repair action set comprising performing a graceful shutdown of a plurality of agents operatively connected to the SCD;
   performing, by the SCD agent and after completing the pre-hitless repair action set, a hitless reset of the SCD; and
   restarting the plurality of agents after the hitless reset completes.

2. The method of claim 1, wherein restarting the plurality of agents comprises learning, by an agent of the plurality of agents, at least a portion of state information of a network chip.

3. The method of claim 1, wherein restarting the plurality of agents comprises obtaining an identity of the plurality of agents operatively connected to the SCD from a master agent list.

4. The method of claim 1, wherein:
   the pre-hitless repair action set comprises instructing, by the SCD agent, an agent of the plurality of agents not to send a stop signal for a delay-period,
   the stop signal is configured to cause the agent to stop, and
   the hitless reset of the SCD is performed within the delay-period.

5. The method of claim 1, further comprising, before performing the pre-hitless repair action set:
   requesting confirmation from a user to proceed with the hitless repair; and
   receiving the confirmation.

6. The method of claim 1, further comprising, before performing the pre-hitless repair action set, verifying that a hitless repair option is set allowing hitless repair.

7. The method of claim 1, wherein performing the hitless reset of the SCD comprises:
   latching an output of the SCD;
   saving a state of the SCD;
   resetting the SCD;
   restoring the state of the SCD; and
   unlatching the output of the SCD.

8. The method of claim 1, wherein making the first determination comprises receiving, at a SCD agent, an error detection signal from the SCD, or detecting that the SCD requires an update.

9. A non-transitory computer readable medium comprising instructions that, when executed by a processor, perform a method for hitless repair, the method comprising:
- making a first determination, by a system control device (SCD) agent of a network device, that a SCD of the network device is to be updated; making a second determination, by the SCD agent, that the SCD and the network device support the hitless repair;
- performing, by the SCD agent, a pre-hitless repair action set comprising performing a graceful shutdown of a plurality of agents operatively connected to the SCD;
- performing, by the SCD agent and after completing the pre-hitless repair action set, a hitless reset of the SCD; and
- restarting the plurality of agents after the hitless reset completes.

10. The non-transitory computer readable medium of claim 9, wherein restarting the plurality of agents comprises learning, by an agent of the plurality of agents, at least a portion of state information of a network chip.

11. The non-transitory computer readable medium of claim 9, wherein restarting the plurality of agents comprises obtaining an identity of the plurality of agents operatively connected to the SCD from a master agent list.

12. The non-transitory computer readable medium of claim 9, wherein:
- the pre-hitless repair action set comprises instructing, by the SCD agent, an agent of the plurality of agents not to send a stop signal for a delay-period,
- the stop signal is configured to cause the agent to stop, and
- the hitless reset of the SCD is performed within the delay-period.

13. The non-transitory computer readable medium of claim 9, wherein the method performed by the instructions further comprises, before performing the pre-hitless repair action set, requesting confirmation from a user to proceed with the hitless repair.

14. The non-transitory computer readable medium of claim 9, wherein the method performed by the instructions further comprises, before performing the pre-hitless repair action set, verifying that a hitless repair option is set allowing hitless repair.

15. The non-transitory computer readable medium of claim 9, wherein performing the hitless reset of the SCD comprises:
- latching an output of the SCD;
- saving a state of the SCD;
- resetting the SCD;
- restoring the state of the SCD; and
- unlatching the output of the SCD.

16. The non-transitory computer readable medium of claim 9, wherein making the first determination comprises receiving, at a SCD agent, an error detection signal from the SCD, or detecting that the SCD requires an update.

17. A system for hitless repair, the system comprising:
a system control device (SCD) agent comprising circuitry and configured to:
- make a first determination that a SCD is to be updated;
- determine that the SCD and a network device support the hitless repair;
- perform a pre-hitless repair action set comprising performing a graceful shutdown of a plurality of agents operatively connected to the SCD;
- perform, after completing the pre-hitless repair action set, a hitless reset of the SCD by executing a set of hitless reset actions; and
- restart the plurality of agents after the hitless reset completes; and the SCD, comprising circuitry, operatively connected to the SCD agent, and configured to:
- perform, in response to the execution of the set of hitless reset actions, the hitless reset.

18. The system of claim 17, wherein:
- to perform the pre-hitless repair action set, the SCD agent is further configured to instruct an agent of the plurality of agents not to send a stop signal for a delay-period,
- the stop signal is configured to cause the agent to stop, and
- the hitless reset of the SCD is performed within the delay-period.

19. The system of claim 17, wherein, to restart the plurality of agents, an agent of the plurality of agents is configured to learn at least a portion of state information of a network chip.

20. The system of claim 17, wherein, to restart the plurality of agents, the SCD agent is further configured to obtain an identity of the plurality of agents operatively connected to the SCD from a master agent list.

21. The system of claim 17, wherein the SCD agent is further configured to, before performing the pre-hitless repair action set, receive confirmation from a user to proceed with the hitless repair.

22. The system of claim 17, wherein the SCD agent is further configured to, before performing the pre-hitless repair action set, verifying that a hitless repair option is set allowing hitless repair.

23. The system of claim 17, wherein, to perform the hitless reset of the SCD, the SCD agent by executing the set of hitless reset actions, is further configured to:
- latch an output of the SCD;
- save a state of the SCD;
- reset the SCD;
- restore the state of the SCD; and
- unlatch the output of the SCD.

24. The system of claim 17, wherein, to make the first determination, the SCD agent is further configured to receive an error detection signal from the SCD, or detect that the SCD requires an update.

* * * * *